United States Patent Office 2,865,953
Patented Dec. 23, 1958

2,865,953

PROCESS FOR PRODUCTION OF POLYHALOGENATED ALIPHATIC DIACIDS AND PRODUCTS OBTAINED THEREBY

John F. Nobis, Cincinnati, Ohio, and Martin Faye, Cambria Heights, N. Y., assignors to National Distillers and Chemical Corporation, New York, N. Y., a corporation of Virginia No Drawing. Application June 9, 1954
Serial No. 435,638

3 Claims. (Cl. 260—485)

This invention relates broadly to a new and useful process for the production of new halo acids and esters and more particularly, to the production of a new group of halogenated dibasic acids and diesters thereof. These new halogenated dibasic acids and diesters are preferably produced by dimerizing a diolefin with an alkali metal, followed by carbonation of the resulting organometallic compound, and subsequent neutralization and addition of halogen to the unsaturated dibasic acids or, if desired, to the diester of the unsaturated dibasic acid.

It is an object of this invention to provide a novel, economical and practical process for the production of a new class of halogen containing dibasic acids and esters.

It is another and more particular object of the invention to prepare chlorine containing dibasic acids and corresponding esters in which the chlorine atoms are precisely located to give particularly desirable isomers essentially uncontaminated by extraneous chlorinated and degraded materials.

It is still another object to prepare pure 3,4,7,8-tetrachlorosebacic acid and certain tetrachlorodimethyl esters of C-10 dibasic acids by a novel combination of reactions. These products and their derivatives find particular use as plasticizers for vinyl resins and fibers. They show better compatability with polyvinyl chloride resins, better permanence because of decreased migration, improved flame retardation, and improved resistance to fungi as well as possessing other advantages.

Additional and further objects will be apparent from the detailed description of the invention which follows.

Heretofore, such products with precisely positioned multiple halogen atoms, could be produced theoretically only by long involved synthetic methods at a considerable cost and with difficulty. The direct action of halogens, including chlorine, bromine and iodine, either alone or in the presence of halogenating catalysts on high molecular weight unsaturated products, generally causes, either instead of or together with the expected addition to the unsaturated linkages, extensive random substitution of hydrogen atoms by halogen atoms. It is also necessary to control the addition of the free halogen and to regulate the reaction conditions such that extensive decarboxylation of the free diacids will not take place.

The invention is based on the discovery that certain aliphatic unsaturated dibasic acids having at least ten carbon atoms can be produced in high yield and purity by the selective dimerization of diolefins followed by the carbonation of the dimetallo dimer derivatives obtained and neutralization of the resulting salts of the diacids. It has been found that these resulting unsaturated dibasic acids will react readily and essentially completely with halogens to yield various and valuable chlorinated diacids. The reaction with elemental chlorine is especially satisfactory and yields very valuable products. It has also been found that the diesters such as the dimethyl esters of the unsaturated diacids give very satisfactory yields of the corresponding pure halogenated diesters. The polychlorinated diesters are of especial usefulness.

The invention is carried out by initially treating an aliphatic conjugated diolefin with finely dispersed sodium or potassium in selected liquid ether medium and, if desired, in the presence of a relatively small amount of a polycyclic aromatic hydrocarbon and/or in the presence of a selected solid, friable attrition agent at controlled temperatures.

The initial step is a reaction which yields a dimerized product of the starting diolefin. For example, in the case where the initial reactants are sodium and butadiene, the dimeric product comprises the disodium derivatives of the aliphatic isomeric octadienes. A study of the structures indicates that this particular selective dimerization can yield the following products:

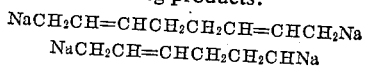
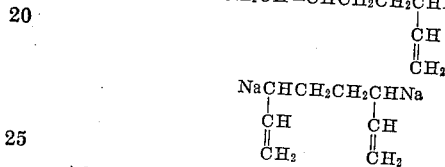

After the foregoing mixture of products has been reacted with carbon dioxide to effect carbonation, the products obtained are the following unsaturated diacids:

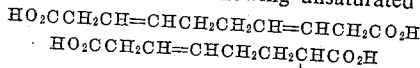
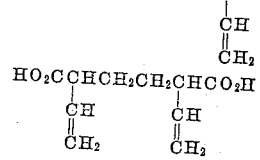

If the reactant used is another diolefin, then the unsaturated diacid products accordingly corresponding to such structures are likewise obtained.

The generalized formula for these products is as follows:

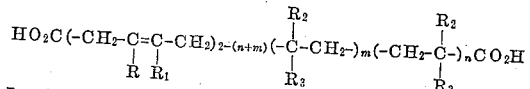

In the above formula, the letters $n$ and $m$ may represent either 0 or 1; R, $R_1$ and $R_2$ represent either an alkyl, aryl, aralkyl or alkaryl radical or a hydrogen atom, and $R_3$ represents an alkenyl radical.

The diolefins which are useful for this improved process includes any aliphatic conjugated diolefin such as, for example, butadiene, isoprene, dimethylbutadiene, the pentadienes such as the methyl-1,3-pentadienes, and the like. In general, it is desirable to use the conjugated aliphatic diolefins having from 4 to 8, inclusive, carbon atoms. Butadiene is particularly suited for use as the diolefin reactant.

Either sodium or potassium can be used as the alkali metal reactant. Sodium is much preferred over potassium since it has been found that sodium gives excellent selectivity and yields of dimerized products, and it is cheaper and more readily available. Mixtures containing a major proportion of sodium are also useful.

One factor in the successful production of the initial dimerized derivatives is the use of the sodium in dispersed form. If bulk sodium is used instead of dispersed sodium, it either yields no product or results largely in the formation of highly condensed polymers from the diolefin. These unwanted polymers can be substantially avoided by employing the alkali metal as a dispersion. Such dispersions are most conveniently made in an inert hydrocarbon or ether preliminary to reaction with the selected diene.

The reaction medium most suitable for reaction of the diolefin with the alkali metal has been found to consist essentially of certain types of ethers. The ether medium can be an aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol by alkyl groups. Examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, glycerol dimethyl ethyl ether, and the like. Generally, simple methyl monoethers such as dimethyl ether and the polyethers of ethylene glycols, such as ethylene glycol dimethyl ether are preferred. Hydrocarbon solvents such as isooctane, kerosene, toluene, and benzene cannot be used exclusively as the reaction media in the dimerization step, since they adversely affect the dimerization reaction of the diolefin and give little or no yield of dimer products.

The ethers used as reaction media should not contain any groups which are distinctly reactive towards sodium. Further, the ether used must not be subject to extensive cleavage under the reaction conditions to yield irreversible reaction products during the dimerization process. Such cleavage action not only destroys the ether but also introduces into the reacting system metallic alkoxides which induce undesirable polymer forming reactions with the diolefins.

Although it is preferred that the reaction medium consist substantially of the ethers as specified, other inert liquid media can be present in limited amounts. In general, these inert media are introduced with the alkali metal dispersion as the liquid in which the sodium is suspended. These inert materials have the principal effect of diluting the ethers. As such dilution increases, a minimum concentration of ether is reached below which the dimerization promoting effect is not evident. It is necessary to maintain the concentration of ether in the reaction mixture at a sufficient level such that it will have a substantial promoting effect upon the diolefin dimerization reaction.

It has also been found highly useful to employ in conjunction with the dimerization reaction one or more techniques of activation for the dimerization process. This can be done in a number of ways and has the effect of increasing the rate of reaction and making the reaction more selective. For instance, a relatively small amount of at least one compound of the polycyclic aromatic class can be included in the reaction mixture. By this term it is intended to include condensed ring hydrocarbons such as naphthalene and phenanthrene, as well as the uncondensed polycyclic compounds such as diphenyl, the terphenyls, dinaphthyl, tetraphenyl ethylene and the like. The polyphenyl compounds such as diphenyl, the terphenyls and their mixtures have been found to be particularly useful. Concentrations in the range of 0.1 to 10 wt. percent based on the amount of diolefins undergoing dimerization are ordinarily quite sufficient.

It has also been found advantageous to carry out the dimerization of the diolefin in the presence of at least one solid friable attrition agent. These activating materials have been found especially valuable for increasing the reaction rate where the dimerization is done in attrition type apparatus such as a ball mill or pebble mill. Friable materials are those which are relatively easily pulverized in this type of apparatus. These materials can further be used either alone or in conjunction with the polycyclic aromatic compounds.

Materials which are suitable for use as the solid friable attrition agents include inorganic solids such as alkali metal salts, for example, sodium chloride, sodium sulfate, potassium sulfate. Also useful is the class of compounds which consists of metallic and non-metallic oxides which are not reactive with metallic sodium under the reaction conditions, for example, sand (silicon dioxide), diatomaceous earth, zircon, and rutile. Carbon, such as in the form of graphite, can also be used. The material can be utilized in a number of ways. For instance, it can be utilized by the addition to the reaction zone of a suitable attrition agent which has been preground or otherwise adjusted to a satisfactory, useful particle size. On the other hand, a relatively coarse size salt or oxide can be added to a pebble mill or ball mill and, while in contact with the solid alkali metal, the friable attrition agent is ground down to effective size.

It is further highly desirable in the process that the reaction temperature in the dimerization step be held below 0° C. The temperature range between −20° and −50° C. is the preferred one for diolefin dimerization. At higher temperatures, the ether diluents tend to yield cleavage products with the result that sufficient alkoxide by-products are formed to yield high molecular weight polymer products.

Immediate subsequent carbonation of the mixture containing dimetalo dimerized products yields the salts of dicarboxylic acids. The carbonation may be done by subjecting the dimetallic-diene derivatives to dry gaseous carbon dioxide, by contact with solid carbon dioxide or by means of a solution of carbon dioxide. The temperature should be controlled below 0° C. to avoid the formation of unwanted by-products. This carbonation forms the dimetallic salts of the unsaturated aliphatic dicarboxylic acids. These salts will contain two more carbon atoms than the dimetallic diene dimers from which they are produced. In the case where butadiene is the starting aliphatic diolefin, there results by this method the selective production of C–10 unsaturated dicarboxylic acids, 3,7-decadiene-1,10-dioic acid, 1,7-decadiene-3,6-dioic acid, and 1,6-decadiene-3,10-dioic acid.

This mixture of unsaturated diacids is then treated with elemental chlorine to give the novel polychlorinated diacids. These may be further converted to the desired diesters.

Alternatively, the mixture of unsaturated diacids can be esterified with methanol, ethanol, etc. in the usual manner and the unsaturated diesters treated with chlorine to give the polychlorinated diesters.

The amount of chlorine in the final product depends on the amount supplied to the unsaturated acid. Temperatures of 0 to −40° C. are best for reactions in which chlorine addition takes place in order to avoid extensive substitution reactions and subsequent degradation reactions.

In the general practice of the invention, the dimerized derivatives are prepared by reaction of a conjugated diolefin with the alkali metal in a suitable ether solvent, in the presence of a small amount of a polycyclic hydrocarbon and/or in the presence of a selected solid friable attrition agent.

The mixture of unsaturated acids from butadiene, for example, will precipitate the straight chain unsaturated diacids and therefore separate a major portion of it from the branched chain unsaturated diacids. This precipitate is the straight chain 3,7-dehydrosebacic acid which may be separated by filtration or centrifugation. Final purification may be accomplished if desired by washing the crude product with a small amount of benzene. Treatment of this 3,7-dehydrosebacic acid with chlorine gives 3,4,7,8-tetrachlorosebacic acid along with minor proportions of the di-, tri-, tetra- and polychloro acids. The lower chloro acids are the result of incomplete chlorination while higher chloro acids probably result from chlorine substitution reactions and/or possible decarboxylation and coupling of the reaction products.

The total mixture of unsaturated dibasic acids obtained from butadiene by the above methods or corresponding mixtures from other diolefins also may be reacted with chlorine to produce tetrachlorodibasic acids or mixtures of chlorine containing dibasic acids.

The unsaturated acids, prepared as indicated from a diolefin, an alkali metal, and carbon dioxide, may be esterified by methods well known to those skilled in the art. Treatment of these dienoic dibasic acid esters with chlorine gives di-, tri-, tetra- and polychloro dibasic acid esters with the tetrachloro compound being the predominant product.

The more detailed practice of the invention is illustrated by the following examples, wherein parts are given by weight unless otherwise specified. These examples and embodiments are illustrative only and the invention is not in any way intended to be limited thereto except as indicated by the appended claims.

Example 1

Disodiooctadiene was prepared from three gram moles of butadiene and three gram atomic weights of sodium in dimethyl ether reaction medium. The reaction was carried out by initially preparing finely divided sodium dispersion in isooctane and contacting the dispersion in the presence of the dimethyl ether reaction medium with butadiene in the presence of a relatively small amount of terphenyl. A temperature of about $-23°$ C. was used. The estimated yield of disodiooctadiene from this reaction was about 1.2 moles.

After the butadiene addition was completed, the reaction mixture, containing the disodium derivatives as a slurry, was carbonated by pouring it upon an excess of solid carbon dioxide. After evaporation of excess carbon dioxide, dimethyl ether, and isooctane, a solid product consisting essentially of the disodium salts of the C–10 unsaturated dicarboxylic acids remained. The free acids were obtained by treatment of these salts with hydrochloric acid and the acids flash distilled for purification purposes. On cooling, a precipitate formed and there were obtained 50 grams of 3,7-dehydrosebacic acid by centrifugation.

To 21 parts of 3,7-dehydrosebacic acid in 300 parts of chloroform, was added 25 parts of chlorine gas at a temperature of $-20°$ C. The excess chlorine was removed with a stream of nitrogen and one-half of the chloroform solvent removed under vacuum. There was obtained by filtration six parts of crude 3,4,7,8-tetrachlorosebacic acid melting at 171–177° C.; neutralization equivalent, 185 (theoretical, 170); percent chlorine, 42.13 (theoretical, 41.80). Recrystallization from dilute ethanol raised the melting point to 188–190° C. and the neutralization equivalent to 175. The remainder of the material obtained by removal of the chloroform solvent was a viscous oil containing 32% chlorine with a neutralization equivalent of 196.

Example 2

Disodiooctadiene was prepared substantially as described in Example 1 and was carbonated in like manner as therein described.

To ten parts of the resulting mixture of unsaturated dibasic acids, consisting of about eight parts of 2-vinyl-5-dehydrosuberic acid (1,6-decadiene-3,10-dioic acid), one part of 3,7-dehydrosebacic acid (3,7-decadiene-1,10-dioic acid), and one part of 2,5-divinyladipic acid (1,7-decadiene-3,6-dioic acid) in 200 parts of chloroform at $-20°$ C. was added 22 parts of chlorine. After the addition was complete, the excess chlorine was removed by a stream of nitrogen and the chloroform distilled under vacuum. The residual oil was extracted with dilute caustic and the extracts neutralized with hydrochloric acid. The oil layer was extracted with chloroform and after removal of this solvent there was obtained five parts of chlorinated acidic material; percent chlorine, 41 (theoretical, 41.8).

Example 3

The dimethyl esters of the mixed unsaturated C–10 dibasic acids were prepared from methanol and the mixture of C–10 dibasic acids using p-toluenesulfonic acid as a catalyst.

To a solution of 50 parts of chlorine in 450 parts of chloroform was added 56 parts of the mixed dimethyl esters. A temperature of $-20°$ C. was maintained. After removal of the free chlorine there was obtained 87 parts of an oily viscous product which contained 36.7% chlorine. Theoretical chlorine percentage for a dimethyl tetrachloro C–10 dibasic acid mixture is 38.6%.

Thus, the chlorination of the dimethyl esters of the crude unsaturated C–10 diacids goes very smoothly and uniformly and results in a yield of the tetrachlorodiesters of above 90%.

Example 4

The diisooctyl esters of the polychlorinated acids were made by transesterification using isooctyl alcohol and the products of Example 3. These diisooctyl esters were incorporated into vinyl films by dissolving into cyclohexane as a solvent and casting films from the resulting solution. The mechanical properties of the resulting plasticized, cast films were studied and found to be satisfactory.

What is claimed is:

1. The process of preparing a mixture of isomeric $C_{10}$ polychlorodicarboxylic acids, which comprises chlorinating a mixture of 3,7-decadiene-1,10-dioic acid, 1,7-decadiene-3,6-dioic acid, and 1,6-decadiene-3,10-dioic acid with elemental chlorine, in substantially stoichiometric amounts, the products having from 1 to 4, inclusive, chlorine atoms per molecule.

2. The process of claim 1 in which chlorination is carried out at a temperature below 0° C.

3. The process of preparing a mixture of isomeric polychloro dialkyl esters, having not more than 9 carbon atoms per alkyl radical, of isomeric $C_{10}$ dicarboxylic acids, which comprises chlorinating a mixture of said dialkyl esters of 3,7-decadiene-1,10-dioic acid, 1,7-decadiene-3,6-dioic acid, and 1,6-decadiene-3,10-dioic acid, with elemental chlorine, in substantially stoichiometric amounts, the products having from 1 to 4, inclusive, chlorine atoms per molecule.

References Cited in the file of this patent

UNITED STATES PATENTS

| | | |
|---|---|---|
| 2,352,461 | Walker | June 27, 1944 |
| 2,445,729 | Radcliffe et al. | July 20, 1948 |
| 2,680,713 | Lindsey et al. | June 8, 1954 |

FOREIGN PATENTS

| | | |
|---|---|---|
| 247,921 | Switzerland | Jan. 3, 1948 |

OTHER REFERENCES

Calingaert et al.: J. Am. Chem. Soc. 73 (1951), pp. 5224–9.

Buchta et al.: Ann. Chem. Liebig, v. 580 (1953), pp. 125–31.

UNITED STATES PATENT OFFICE
CERTIFICATE OF CORRECTION

Patent No. 2,865,953                                                          December 23, 1958

John F. Nobis et al.

It is hereby certified that error appears in the printed specification of the above numbered patent requiring correction and that the said Letters Patent should read as corrected below.

Column 4, lines 42 and 43, for "3,7-decadiene-1,10-dioic acid, 1,7-decadiene-3,6-dioic acid, and 1,6-decadiene-3,10-dioic acid" read -- 3,7-decadienedioic acid, 2,5-divinyl-hexanedioic acid, and 2-vinyl-5-octenedioic acid --; column 5, line 67, for "1,6-decadiene-3,10-dioic" read -- 2-vinyl-5-octenedioic --; lines 68 and 69, for "3,7-decadiene-1,10-dioic" read 3,7-decadienedioic --; lines 69 and 70, for "1,7-decadiene-3,6-dioic" read -- 2,5-divinyl-hexanedioic --; column 6, lines 40 and 41, for "3,7-decadiene-1,10-dioic acid, 1,7-decadiene-3,6-dioic acid, and 1,6-decadiene-3,10-dioic" read -- 3,7-decadienedioic acid, 2,5-divinyl-hexanedioic acid, and 2-vinyl-5-octenedioic --; lines 51 and 52, for "3,7-decadiene-1,10-dioic acid, 1,7-decadiene-3,6-dioic acid, and 1,6-decadiene-3,10-dioic" read -- 3,7-decadienedi acid, 2,5-divinyl-hexanedioic acid, and 2-vinyl-5-octenedioic --.

Signed and sealed this 26th day of May 1959.

(SEAL)
Attest:

KARL H. AXLINE                                                 ROBERT C. WATSON
Attesting Officer                                         Commissioner of Patents